US012444565B2

(12) United States Patent
Lee et al.

(10) Patent No.: US 12,444,565 B2
(45) Date of Patent: Oct. 14, 2025

(54) METHOD OF MANUFACTURING A FILAMENT, FILAMENT MANUFACTURED THEREBY, AND X-RAY TUBE HAVING THE FILAMENT

(71) Applicant: REMEDI CO., LTD, Chuncheon-si (KR)

(72) Inventors: Re Na Lee, Seoul (KR); Sung Ho Cho, Seoul (KR); Byoung Tae Jang, Bucheon-si (KR)

(73) Assignee: REMEDI CO., LTD (KR)

( * ) Notice: Subject to any disclaimer, the term of this patent is extended or adjusted under 35 U.S.C. 154(b) by 0 days.

(21) Appl. No.: 17/925,606

(22) PCT Filed: Nov. 3, 2022

(86) PCT No.: PCT/KR2022/017148
§ 371 (c)(1),
(2) Date: Nov. 15, 2022

(87) PCT Pub. No.: WO2024/048843
PCT Pub. Date: Mar. 7, 2024

(65) Prior Publication Data
US 2024/0234070 A1 Jul. 11, 2024

(30) Foreign Application Priority Data
Aug. 29, 2022 (KR) ........................ 10-2022-0108486

(51) Int. Cl.
*H01J 9/02* (2006.01)
*H01J 35/08* (2006.01)

(52) U.S. Cl.
CPC ............... *H01J 9/02* (2013.01); *H01J 35/112* (2019.05)

(58) Field of Classification Search
CPC .... H01J 9/02; H01J 9/04; H01J 35/064; H01J 35/112; H01J 35/14; H01J 35/18;
(Continued)

(56) References Cited

U.S. PATENT DOCUMENTS 10,181,390 B2 1/2019 Takahashi et al.
10,763,069 B2 * 9/2020 Kumadaki ............ H01J 35/153
(Continued)

FOREIGN PATENT DOCUMENTS

JP 2005190757 A 7/2005
JP 2010186694 A 8/2010
(Continued)

OTHER PUBLICATIONS

Written Opinion for PCT/KR2022/017148 mailed May 24, 2023.

*Primary Examiner* — Irakli Kiknadze
(74) *Attorney, Agent, or Firm* — Renaissance IP Law Group LLP

(57) ABSTRACT

The present inventive concept provides a method for manufacturing a filament including the steps of inserting and bonding an electrode having a desired length into a through-hole of a plate-shaped base to form a first part; bonding a wire having a desired length to one surface of a plate-shaped disc to form a second part; and bonding the electrode of the first part and the wire of the second part to form a filament, a filament manufactured by said method, and an X-ray tube having said filament.

5 Claims, 12 Drawing Sheets

(58) Field of Classification Search
CPC .... H01J 35/08; H01J 35/147; H01J 2235/023; H01J 35/06; H01J 35/066; H01J 19/60; H01J 5/26; H01J 35/165; H01J 29/92; H01J 1/18; H01J 2893/0008; H01J 2237/032; H01J 2237/166; H01J 29/90; H01J 19/48; H01J 19/66; H01J 5/22; H01J 35/20; H01J 35/065; H01J 2209/3855; H01J 2235/205; H01J 19/10; H01J 19/42; H01J 29/50; H01J 3/06; H01J 37/065; H01J 2235/18; H01J 9/042; H01J 35/16; H01J 35/101; H01J 35/26; H01J 9/18; H01J 2235/06; H05G 1/10; G03G 21/02; G03G 21/1889; G03G 2221/1615; G03G 2221/1657; G03G 2221/1663; G03G 2221/1823; G03G 2221/183; G06Q 40/12; G07F 17/0014; G07F 17/26; A61B 6/40; A61B 6/44; H05F 3/06
USPC ................................ 378/136, 119, 121, 143
See application file for complete search history.

(56) References Cited

U.S. PATENT DOCUMENTS

| | | | | |
|---|---|---|---|---|
| 10,991,539 | B2 * | 4/2021 | Kenmotsu | H01J 35/153 |
| 10,998,160 | B2 * | 5/2021 | Steinlage | H01J 35/064 |
| 11,037,751 | B2 * | 6/2021 | Ishihara | H01J 35/066 |
| 2005/0141670 | A1 * | 6/2005 | Ichikawa | H01J 35/147 378/138 |
| 2016/0365218 | A1 * | 12/2016 | Takahashi | H01J 19/60 |

FOREIGN PATENT DOCUMENTS

| | | | |
|---|---|---|---|
| JP | 2014232629 | A | 12/2014 |
| KR | 20170024984 | A | 3/2017 |
| KR | 20220007379 | A | 1/2022 |

* cited by examiner (a)

(b)

X-AXIS

Y-AXIS

X-AXIS

Y-AXIS

METHOD OF MANUFACTURING A FILAMENT, FILAMENT MANUFACTURED THEREBY, AND X-RAY TUBE HAVING THE FILAMENT

TECHNICAL FIELD

The present disclosure is directed to a filament for an X-ray generator. More particularly, the present inventive concept is directed to a method for manufacturing a filament which is capable of concentrating X-ray beam energy to obtain high-efficiency dose and good resolution, a filament manufactured by said method, and an X-ray tube having said filament.

BACKGROUND

An X-ray system which is capable of imaging the inside of the human body in a non-invasive way is commonly used for diagnosis and treatment in medical institutions, and has been developed to enable more convenient and precise use owing to the development of advanced technology. In addition, the X-ray system is used to observe the internal shape of a subject not only in the medical field but also in the non-destructive examination field.

An X-ray system uses the principle that X-rays irradiated to a subject are absorbed differently according to a difference in density of substances inside the subject. Since a tissue with a high density absorbs more X-rays than a tissue with a low density, when the transmitted X-rays are observed in an X-ray photosensitive film or a detector after X-rays are transmitted through a living tissue, tissues with high density appear darker than tissues with low density. Accordingly, the structure of internal tissues of the subject can be clearly distinguished by the density difference.

In general, such an X-ray system may include an X-ray tube that generates X-rays, a voltage generator that generates and supplies a high voltage required for the X-ray tube, an X-ray detector that detects X-rays passing through a subject, and a controller that controls the operation of the X-ray tube and the voltage generator. Here, the X-ray tube and the voltage generator constitute an X-ray generator.

The X-ray generator generates X-rays by providing a predetermined signal to the X-ray tube according to tube voltage, tube current, irradiation time, etc. calculated appropriately from the voltage generator, and colliding thermal electrons emitted from a filament (cathode) of the X-ray tube according to said signal provided from the voltage generator on a target (anode) at high speed. That is, X-rays are generated in a way that a current flows from the voltage generator to the filament of the X-ray tube to heat the filament, electron emission is induced in the heated filament to emit electrons around the filament, and the emitted electrons move toward the target and collide with the target due to a strong electric field caused by a high voltage difference.

A filament of an X-ray generator for inducing electron emission is shown in FIG. 1. As shown in FIG. 1*a*, the filament may include a base 11, two electrodes 12 formed through the base 11, and an emitter 13 formed between the two electrodes facing a target. Here, the emitter 13 may be made of a metallic material and may have a spring-like shape twisted up and down, i.e., coil shape as shown in FIG. 1*a* or a flat spiral shape as shown in FIG. 1*b*. FIG. 1*b* shows the top plane of the emitter 13, the lower structure of which is the same as the base 11 and the electrode 12 shown in FIG. 1*a* wherein both ends of the spiral are connected to two electrodes 12.

However, there is a problem that a filament having an emitter with a conventional shape, such as coil or spiral shape as shown in FIGS. 1*a* and 1*b*, cannot concentrate X-ray beam energy, so that good resolution cannot be obtained. That is, the conventional types of emitter cannot focus the beam energy on a target, and thus the beam energy is dispersed and the beam energy density is lowered. Accordingly, high-efficiency dose and good resolution cannot be obtained.

RELATED PRIOR ART

Korean Application Publication No. 10-2022-0007379

DESCRIPTION

Technical Task to be Solved

To solve the above-mentioned problems, the present inventive concept provides a method for manufacturing a filament which is capable of concentrating X-ray beam energy to obtain high-efficiency dose and good resolution.

Also, the present inventive concept provides a method of manufacturing a filament which is capable of concentrating X-ray beam energy by changing a shape of an emitter.

Further, the present inventive concept provides a filament, a method for manufacturing the same, and an X-ray tube including the same.

Means for Solving the Technical Task

According to an embodiment of the present inventive concept, a method for manufacturing a filament includes the steps of inserting and bonding an electrode having a desired length into a through-hole of a plate-shaped base to form a first part: bonding a wire having a desired length to one surface of a plate-shaped disc to form a second part: and bonding the electrode of the first part and the wire of the second part to form a filament.

The step of forming a first part and the step of forming a second part are performed simultaneously or sequentially.

The base is larger and thicker than the disc, and the electrode has a larger line width than the wire.

The step of forming a first part includes the steps of providing a plate-shaped base with a through-hole and an electrode having a desired length: inserting the electrode into the through-hole of the base and providing a brazing filler in a bonding portion: and carrying out brazing at a desired temperature to bond the base and the electrode.

The brazing process is carried out by increasing a temperature to a melting point of the brazing filler in a step-wise manner.

The brazing process includes the steps of introducing a coupled entity of the base and the electrode into a furnace: increasing a temperature of the furnace from room temperature to a first temperature at a desired ramp-up rate (a first heat-up step): heating the resulting product to the first temperature for a desired time to remove residual organic matters (a burn-out step); increasing the furnace temperature from the first temperature to a second temperature at a desired ramp-up rate (a second heat-up step); maintaining the second temperature for a desired time (a preheating step): increasing the furnace temperature from the second temperature to a third temperature at a desired ramp-up rate (a third heat-up step): carrying out brazing at the third temperature for a desired time to bond the base and the electrode (a brazing step); lowering the furnace temperature from the third temperature at a desired ramp-down rate (a furnace cooling step): and withdrawing a first part that the base and the electrode are bonded and cooling the first part in air (an air cooling step).

The step of forming a second part includes the steps of providing a wire having a desired length and a plate-shaped disc: and placing the wire on one surface of the disc and bonding the disc and the wire using a micro-spot welding process.

The electrode of the first part is bonded to the wire of the second part using a micro-spot welding process.

The electrode is bonded to the wire by aligning the center of the base with the center of the disc.

According to another embodiment of the present inventive concept, a filament includes a plate-shaped base having a desired thickness: an electrode provided through at least two regions of the base: a wire connected to one end of the electrode: and a plate-shaped disc connected to the other end of the wire that is opposite to one end connected to the electrode.

The base, the electrode, the wire and the disc are made of different materials.

The base is larger and thicker than the disc, and the electrode has a larger line width than the wire.

The center of the base is aligned and bonded with the center of the disc.

According to another embodiment of the present inventive concept, an X-ray tube includes a filament configured to emit electrons by the supply of power: a target configured to receive the electrons from the filament and emit X-rays: a body configured to seal the filament and the target while facing each other: and a cap configured to emit heat in close contact with the target, wherein the filament includes a plate-shaped base having a desired thickness: an electrode provided through at least two regions of the base: a wire connected to one end of the electrode: and a plate-shaped disc connected to the other end of the wire that is opposite to one end connected to the electrode.

The target has a shape inclined in a direction that X-rays are emitted.

The centers of the base, the electrode and the target are together aligned.

Effects of the Invention

A filament according to the embodiments of the present inventive concept is characterized by passing an electrode through a plate-shaped base having a desired thickness, connecting a wire to one region of the electrode, and connecting a plate-shaped disc to an end of the wire. At this time, the centers of the plate-shaped base and the plate-shaped disc are aligned with each other and the center of a target. In addition, the filament according to the embodiments of the present inventive concept is manufactured by bonding the base and the electrode by high-temperature brazing, and bonding the wire and the disc, and the electrode and the wire by micro-spot welding.

A plate disc-shaped filament according to the present inventive concept can concentrate X-ray beam energy in a narrow region of a target compared to the prior art, and thus high-efficiency dose and good resolution can be obtained. That is, when a conventional spring-shaped filament is used, X-ray beam energy is not concentrated in a narrow region of a target and spreads widely. In contrast, the plate disc-shaped filament according to the present inventive concept can concentrate X-ray beam energy in a narrow region of a target compared to the conventional filament, and thus high-efficiency dose and good resolution over the prior art can be obtained.

PREFERRED EMBODIMENTS

Figure 1:
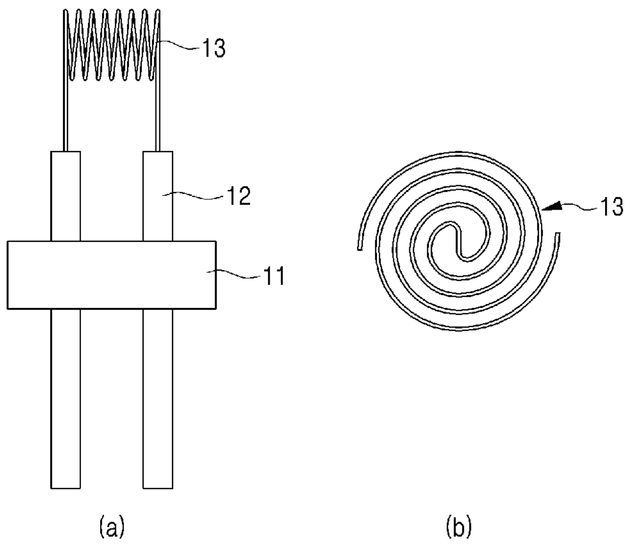
FIG. 1 is a view showing a conventional filament.

Hereinafter, the embodiments of the present inventive concept will be described in detail with reference to the accompanying drawings. However, the present inventive concept is not limited to the embodiments disclosed below and may be implemented in many different forms. It should be understood that these embodiments are provided only to complete the disclosure of the present inventive concept, and to fully inform those skilled in the art the scope of the present inventive concept. In order to clearly express various layers and each region in the drawings, a thickness is enlarged. In the drawings, the same reference numerals refer to the same elements.

I. Structure of a Filament According to the Present Inventive Concept

Figure 2:
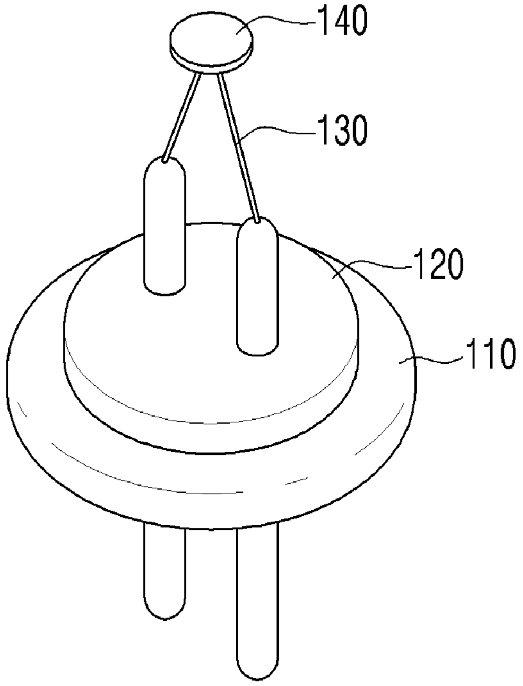
FIGS. 2 and 3 are a perspective view and a side view of a filament according to an embodiment of the present inventive concept, respectively.
Figure 3:
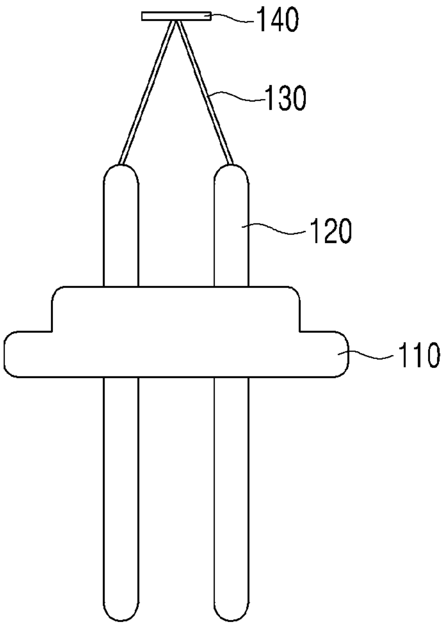
Figure 4:
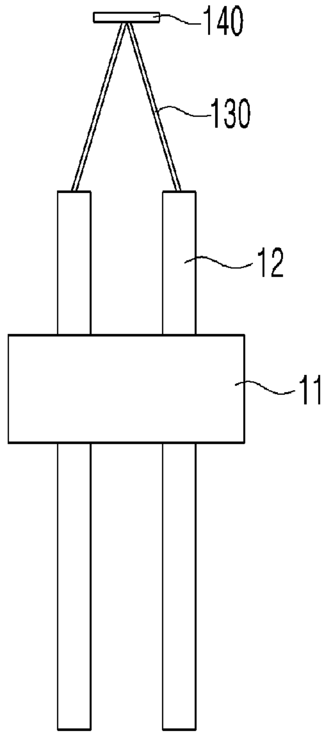
FIGS. 4 and 5 are side views of filaments according to other embodiments of the present inventive concept.
Figure 5:
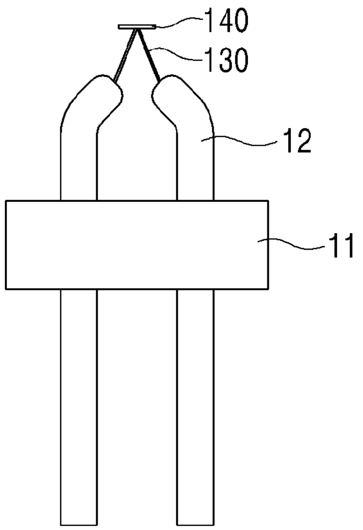

FIG. 2 is a perspective view of a filament according to an embodiment of the present inventive concept, and FIG. 3 is a side view of a filament according to an embodiment of the present inventive concept. Also, FIGS. 4 and 5 are side views of filaments according to other embodiments of the present inventive concept.

Now, referring to FIGS. 2 and 3, a filament according to an embodiment of the present inventive concept may include a plate-shaped base 110 having a desired thickness: an electrode 120 formed through at least two regions of the base 110: a wire 130 connected to one end of the electrode 120: and a plate-shaped disc 140 connected to the other end of the wire 130 opposite to one end connected to the electrode 120.

Hereinafter, the filament according to an embodiment of the present inventive concept will be described in more detail for each element.

1. Base

The base 110 is configured to fix the disc 140 facing a target and fix the filament within an X-ray tube. That is, in order for electrons generated from the filament to move toward the target due to a high voltage, the filament must be securely fixed inside the X-ray tube, and a side opposite to the target must be blocked. To this end, the base 110 of the filament is provided within the X-ray tube spaced apart from the target. Also, the base 110 has through-holes through which the electrode 120 passes in two or more regions. Preferably, the base 110 has two through-holes formed to be spaced apart from each other by a desired distance based on its central point, and the electrode 120 is inserted and fixed through the through-holes. That is, since the electrode 120 is inserted and fixed through the through-holes of the base 110, the power may be supplied to the filament from the outside while the filament is present inside the X-ray tube. The base 110 may be made of a ceramic material and may have a circular plate shape having a desired thickness. The base 110 may have a double plate shape including a first plate and a second plate as shown in FIGS. 2 and 3, or a single plate shape as shown in FIG. 4. When the base 110 has the double plate shape, the first and second plates may have the same size. Alternatively, when the base 110 has the double plate shape, a lower first plate may be larger than an upper second plate. That is, the upper second plate close to the disc 140 may have a smaller diameter than the lower first plate. However, even when the base 110 has the double plate shape of the first and second plates, the through-holes may be formed to have the same size in the same region in the first and second plates. When the double plate shape is used, the first and second plates may be formed of the same material or different materials. That is, the first and second plates may be formed of the same material or different materials having the same size, or the first and second plates may be formed of the same material or different materials having different sizes. As an example, the first and second plates may be formed in a stepped shape from the same material having difference sizes. As another example, the first and second plates may be formed by bonding from the same material or different materials having different sizes.

2. Electrode

The electrode 120 is inserted into and fixed to the base 110 through the through-hole. The electrode 120 is connected to an external voltage generator to apply a current to the disc 140 connected to the electrode 120, so that thermal electrons may be generated from the disc 140. The electrode 120 may be made of a metallic material which is different from the base 110. For example, the electrode 120 may be made of a material that conducts electricity well such as copper, or may be made of Kovar. According to an embodiment of the present inventive concept, the electrode 120 may be made of Kovar, an alloy of iron, nickel, and cobalt, which has properties similar to ceramic as the material of the base 110, and has a coefficient of thermal expansion similar to that of glass at a low temperature. Also, the electrode 120 may have a shape in which an upper portion of the base 110 is bent. That is, as shown in FIG. 5, the upper portions of two electrodes 120 may be bent to face each other. A length of the wire 130 may be adjusted by bending a portion of the electrode 120. The length of the wire 130, i.e., a length between a connection point with the electrode 120 and a connection point with the disc 140 may determine the characteristics (specification) of the product, and the length of the wire 130 may be adjusted by the bending of the electrode 120. The base 110 and the electrode 120 may be boned by high-temperature brazing. That is, after inserting the electrode 120 into the through-hole of the base 110, the electrode 120 may be bonded and fixed to the base 110 by high-temperature brazing. The bonding of the base 110 and the electrode 120 using such high-temperature brazing will be described in detail later in a filament manufacturing method.

3. Wire

The wire 130 may be provided to connect the electrodes 120 and the disc 140. Also, the electrodes 120 may be directly connected to the disc 140 without the wire 130 by bending two electrodes 120 inward. It is preferable to connect the electrodes 120 to the disc 140 through the wire 130 in consideration of a distance between two electrodes 120, a size of the disc 140, etc. The wire 130 is thinner than the electrodes 120, and may be formed of the same or a different material as the electrodes 120. For example, the wire 130 may be formed of tungsten or tungsten alloys. As the tungsten alloy, an alloy of tungsten and rhenium such as Tungsten 97% Rhenium 3% alloy may be used. The wire 130 may be made of two separate parts, or as a single elongate part. That is, two wires 130 may be respectively extended from the distal ends of two electrodes 120 and may be connected to a lower surface of the disc 140. Alternatively, both distal ends of one wire 130 may be connected to the distal ends of two electrodes 120 with its central portion bent and may be connected to a lower surface of the disc 140. According to an embodiment of the present inventive concept, one wire 130 may be bent to be connected to the electrodes 120 and the disc 140. In this case, the wire 130 may be bonded to the electrodes 20 and the disc 140 by micro-spot welding.

4. Disc

The disc 140 may be provided in the form of a plate having a desired thickness. The disc 140 may be provided in a circular plate shape having a size and a thickness smaller than that of the base 110. One surface (lower surface) of the disc 140 is bonded to the wire 130, and the other surface (upper surface) opposite to this surface faces the target. The disc 140 may be made of a metallic material such as Ta. Here, the center of the disc 140 may be aligned with the center of the base 110. That is, an X-ray beam must be focused on the target for high-efficiency dose and good resolution. To this end, the center of the disc 140 and the center of the target must be aligned. According to the present inventive concept, the centers of the base 110, the disc 140 and the target are aligned to concentrate the X-ray beam. The size of the disc 140 and the length of the wire 130 are major factors that may determine the characteristics (specification) of the product. Here, the length of the wire 130 may be a length between the electrode 120 and the disc 140. For example, if an X-ray dose should be 3 mA, the disc 140 may have a diameter of 1.22 mm and a thickness of 0.1 mm, and the wire 130 may have a line width of 0.1 mm and a length of 2.8 mm.

II. X-Ray Tube Having a Filament According to the Present

Figure 6:
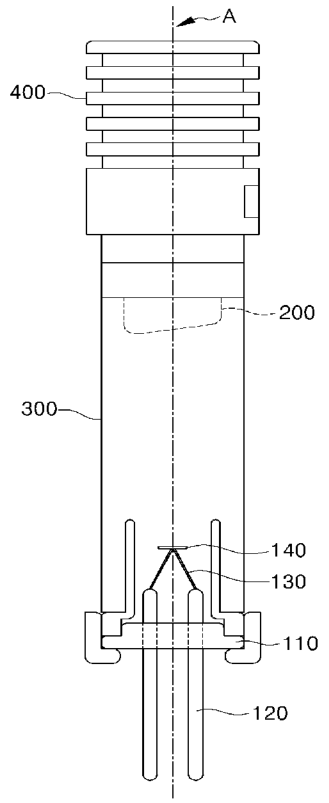
FIG. 6 is a cross-sectional view of an X-ray tube to which a filament according to an embodiment of the present inventive concept is applied.

FIG. 6 is a cross-sectional view of an X-ray tube to which a filament according to an embodiment of the present inventive concept is applied.

Referring to FIG. 6, an X-ray tube according to an embodiment of the present inventive concept may include a filament 100 configured to emit electrons by the supply of power: a target 200 configured to receive the electrons from the filament and emit X-rays: a body 300 configured to seal the filament 100 and the target 200 while facing each other; and a cap 400 configured to emit heat in close contact with the target 200. Here, the filament 100 may include a plate-shaped base 110 having a desired thickness: an electrode 120 formed through at least two regions of the base 110; a wire 130 connected to one end of the electrode 120: and a plate-shaped disc 140 connected to the other end of the wire 130 opposite to one end connected to the electrode 120, as shown in FIGS. 2 to 5 according to the embodiments of the present inventive concept. The filament 100 is configured to emit electrons by power supplied from an external power generator. That is, the filament 100 heats the disc 140 using power supplied from an external power supply connected to the electrode 120. When the disc 140 is heated above a particular temperature, electrons are emitted. At this time, the electrons emitted from the filament 100 are rapidly moved toward the target 200 due to a high voltage generated between the filament 100 and the target 200, and the moved electrons collide with the target 200, thereby generating X-rays.

The target 200 is provided on the other side of the body 300 to face the filament 100, and is configured to receive the electrons emitted from the filament 100 and emit X-rays. The target 200 is preferably made of a metallic material such as copper. The electrons move at a high speed due to a high voltage and collide with a surface of metal, thereby generating X-rays. Also, the target 200 has a shape inclined in a direction in which X-rays are emitted, and is configured to emit X-rays in said direction when the electrons emitted from the filament 100 collide with the target 200. Since different X-ray emission patterns may be produced in the same electrons according to the structure, slope, material, etc. of the target 200, the target 200 may have various structures for the applications of X-rays.

The body 300 has one side connected to the filament 100 and the other side connected to the target 200 and is configured to form a sealing between the filament 100 and the target 200. That is, the filament 100 and the target 200 are sealed inside the body 300 while facing each other. The inside of the X-ray tube should be in a vacuum state so that electrons can move without being disturbed. To this end, the body 300 is required to enclose the entire X-ray tube including the filament 100 and the target 200. The body 300 is preferably made of a ceramic material which is capable of insulating a high voltage and does not affect the movement of electrons. Also, it is preferable that a metal part in contact with the body 300 made of a ceramic material be manufactured using a material having a coefficient of thermal expansion similar to that of the ceramic material such as Kovar, to resist a high temperature.

The cap 400 is configured to emit heat in close contact with the target 200 opposite to the body 300. That is, when the electrons are emitted from the filament 100 and collide with the target 200 to generate X-rays, heat is generated in the collision process. In particular, when high-energy X-rays are emitted from a small X-ray apparatus rather than a large X-ray apparatus, a lot of heat is generated in a narrow target area, so that this may cause the deformation of the device or affect its performance. Accordingly, the cap 400 is connected to the target 200 that generates a lot of heat to serve to rapidly dissipate heat from the target 200. To this end, the cap 400 is preferably made of a metallic material having high electrical conductivity. Also, the outer surface of the cap 400 may be formed in a corrugated shape to maximize its heat dissipation area, thereby increasing heat dissipation efficiency. Also, the cap 400 may preferably be made of the same material as the target 200 to rapidly dissipate heat from the target 200. As a material for the cap 400, a metal such as copper that facilitates X-ray emission may be used.

The X-ray tube according to the present inventive concept may have the center of the filament 100 aligned with the center of the target 200. That is, as shown in FIG. 6, a center line (A) may be provided at a central portion of the filament 100 and the target 200. At this time, the center of the disc 140 may be aligned with the center of the base 110. A distance from the disc 140 to the target 200 and their alignment are important in X-rays. That is, it is important that the center of the disc 140 and the center 200 of the target are aligned. Such alignment is more important for a small product since it has a smaller target. That is, in order to generate X-rays having high-efficiency dose and good resolution, an X-ray beam must be focused on the target 200. To this end, the centers of the disc 140 and the target 200 must be aligned. According to the present inventive concept, the centers of the base 110, the disc 140 and the target 200 are aligned to concentrate the X-ray beam.

III. X-Ray Generator Having an X-Ray Tube According to the Present

Figure 7:
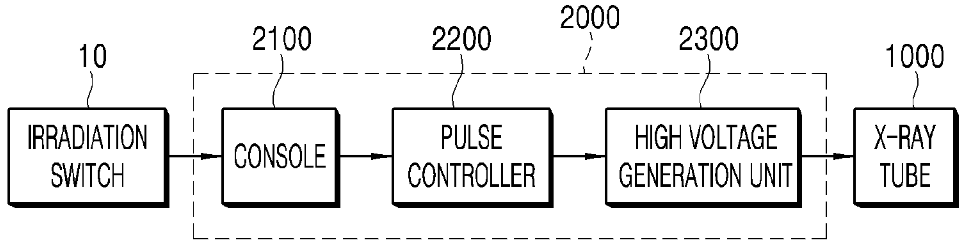
FIG. 7 is a block diagram illustrating an X-ray generator including an X-ray tube to which a filament according to an embodiment of the present inventive concept is applied and a voltage generator.

FIG. 7 is a block diagram illustrating an X-ray generator including an X-ray tube to which a filament according to an embodiment of the present inventive concept is applied and a voltage generator.

Referring to FIG. 7, an X-ray generator according to an embodiment of the present inventive concept may include an X-ray tube 1000 and a voltage generator 2000. The voltage generator 2000 may include a console 2100, a pulse controller 2200, and a high voltage generation unit 2300.

The X-ray tube 1000 has a configuration as shown in FIG. 6. That is, the X-ray tube 1000 includes the filament 100 configured to emit electrons and the target 200 configured to be collided with the emitted electrons and emit X-rays. When power is supplied from the voltage generator 2000 through the electrode 120 to heat the disc 140, the filament 100 emits thermal electrons. When a high pressure of 20 kV or more is supplied between the filament of the X-ray tube and the target, the emitted electrons collide with the target at high speed to generate X-rays.

The voltage generator 2000 may generate a desired voltage and supplies it to the X-ray tube 1000. That is, the voltage generator 2000 may generate a desired voltage for generating X-rays in the X-ray tube 1000. In the embodiments of the present inventive concept, the voltage generator 2000 may generate a voltage by using a pulse width modulation (PWM) method. The voltage generator 2000 using the pulse width modulation method according to the embodiments of the present inventive concept may include the console 2100 which receives an X-ray irradiation signal from an X-ray irradiation switch 10, generates control signals for on/off, tube voltage, tube current, and irradiation time of the X-ray generator and detects an X-ray irradiation signal: the pulse controller 2200 which generates pulse signals having a desired width to be modulated for said tube voltage, tube current, and irradiation time according to the control signals from the console 2100: and the high voltage generation unit 2300 which generates a DC high voltage according to the pulse signals from the pulse controller 2200 and applies it to the X-ray tube 1000. In the voltage generator 2000 according to the present inventive concept, the console 2100 detects the X-ray irradiation signal to generate a desired detection signal, and the pulse controller 2200 detects the detection signal from the console 2100 to control the pulse signals.

Figure 8:
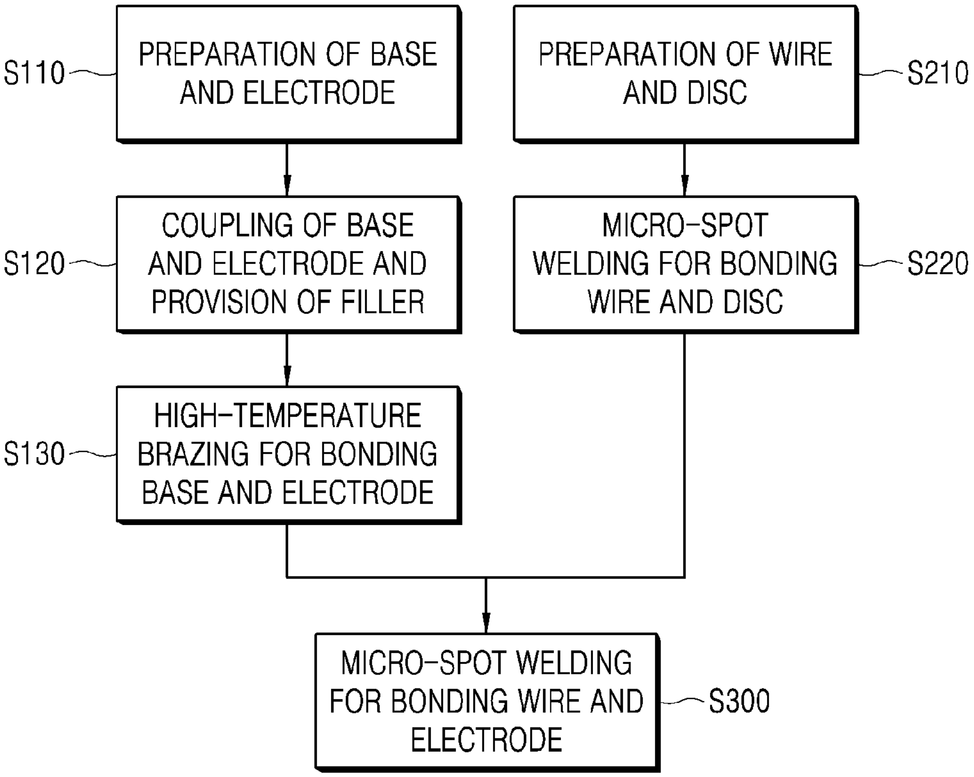
FIG. 8 is a process flow chart illustrating a filament manufacturing method according to an embodiment of the present inventive concept.
Figure 9:
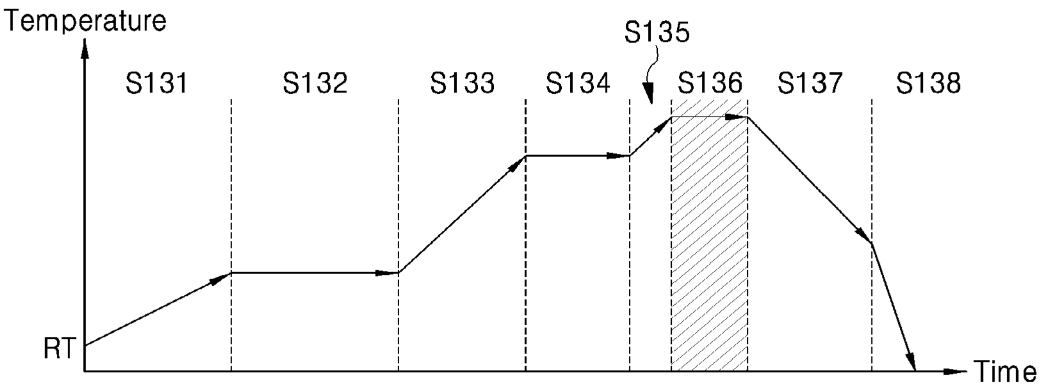
FIG. 9 is a process recipe graph illustrating high-temperature brazing for bonding a base and an electrode in a filament manufacturing method according to an embodiment of the present inventive concept.
Figure 10:
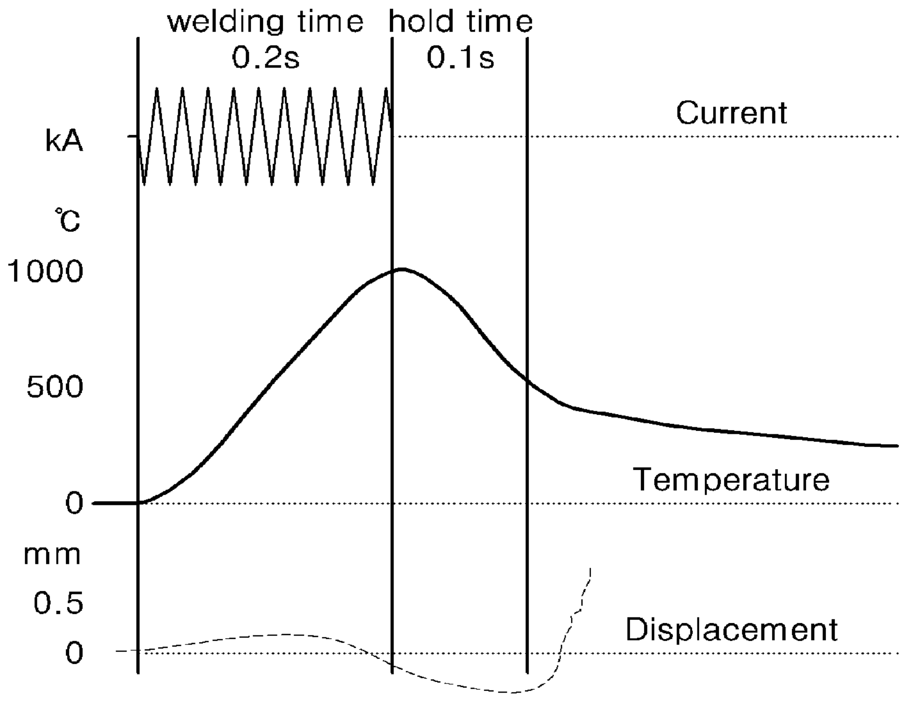
FIG. 10 is a graph illustrating a condition for a micro-spot welding process according to an embodiment of the present inventive concept.
Figure 11:
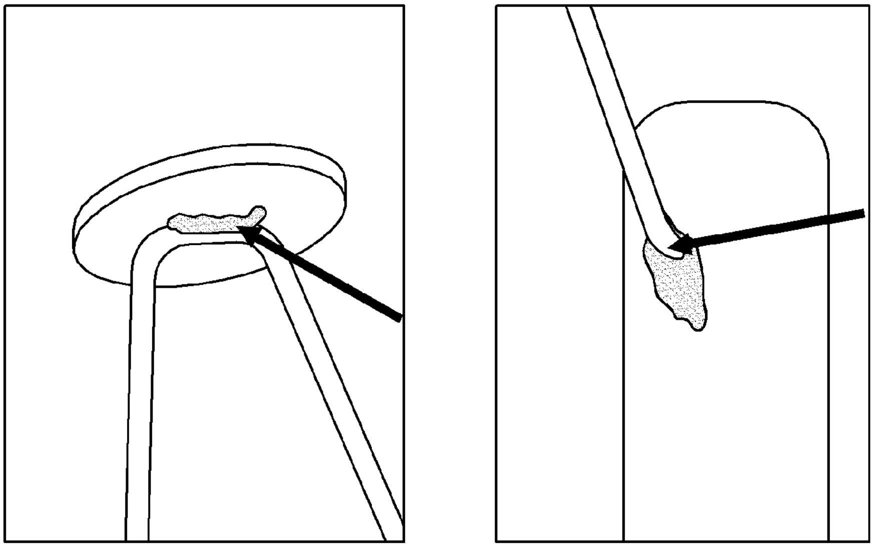
FIG. 11 is a view showing a state bonded by micro-spot welding.

IV. Method for Manufacturing a Filament According to the Present Inventive Concept FIG. 8 is a process flow chart illustrating a filament manufacturing method according to an embodiment of the present inventive concept: FIG. 9 is a process recipe graph illustrating high-temperature brazing for bonding a base and an electrode according to an embodiment of the present inventive concept: FIG. 10 is a graph illustrating a condition for a micro-spot welding process according to an embodiment of the present inventive concept: and FIG. 11 is a view showing a state bonded by micro-spot welding.

Referring to FIG. 8, a filament manufacturing method according to an embodiment of the present inventive concept may include the steps of bonding a base and an electrode to form a first part (S110, S120, S130: S100): bonding a wire and a disc to form a second part (S210, S220; S200); and bonding the electrode and the wire of the first and second parts to form a filament (S300). Here, the step of bonding a base and an electrode to form a first part (S100) may include the steps of preparing the base and the electrode (S110): coupling the base to the electrode and providing a brazing filler (S120): and carrying out high temperature brazing to bond the base and the electrode (S130). The step of bonding a wire and a disc to form a second part (S200) may include the steps of preparing the wire and the disc, respectively (S210): and bonding the wire and the disc using micro-spot welding (S220). A filament may be manufactured (S300) by bonding the electrode and the wire of the first and second parts formed in each of said steps using micro-spot welding. At this time, the step of bonding a base and an electrode (S100) and the step of bonding a wire and a disc (S200) may be performed in parallel (i.e., simultaneously in separate processes) as described above, or these steps may be sequentially performed (one process followed by another process). That is, in a sequential case, the step of bonding a base and an electrode may be performed followed by the step of bonding a wire and a disc, or the step of bonding a wire and a disc may be performed followed by the step of bonding a base and an electrode. Also, the step of bonding a base and an electrode (S100) may be performed by high-temperature brazing using the recipe of temperature and time as shown in FIG. 9: and the steps of boding a wire and a disc (S200) and bonding an electrode and the wire (S300) may be performed by micro-spot welding using the respective conditions as shown in FIG. 9.

Hereinafter, the filament manufacturing method according to an embodiment of the present inventive concept will be described in more detail for each step.

1. Bonding of the Base and the Electrode (Formation of the First Part)

To form a first part, the step of bonding a base and an electrode (S100) may be carried out using the high temperature brazing according to the process conditions as illustrated in FIG. 9. First, the base and two electrodes are provided (S110). The base has a circular plate shape having two through-holes formed in the center and is made of a ceramic material. The electrodes have a rod shape and are made of a metallic material. Then, the electrodes are inserted into the through-holes of the base and a brazing filler (filler metal) is provided at a bonding portion between the base and the electrodes (S120). Finally, the base and the electrodes are bonded by the high temperature brazing (S130).

1.1. Preparation of the Base and the Electrode (S110)

The base serves to fix the disc to face the target and to fix the filament within the X-ray tube. Therefore, the base may have a diameter corresponding to an inner diameter of the X-ray tube to tightly enclose the X-ray tube. Also, the base may have the same shape as a cross-sectional shape of the X-ray tube, for example, a circular base may be provided. That is, the base may have a circular plate shape with a desired thickness. The base has through-holes in two or more regions through which the electrodes pass. Preferably, the base has two through-holes formed to be spaced apart from each other by a desired distance based on the central point. The base may be made of a ceramic material.

The electrode receives power from an external voltage generator and transmits it to the disc to generate electrons from the disc. The electrode has a desired length and may be prepared in a shape corresponding to the through-holes of the base. For example, if the through-holes are circular, the electrodes may have a cylindrical shape, and if the through-holes are rectangular, the electrodes may have a hexahedral shape. Also, the electrode may have a desired length, i.e., an appropriate length depending on a length inserted into the X-ray tube through an upper side of the base and a length extending below the base and connected to the voltage generator. In this case, since a distance between the disc and the target may be adjusted according to a length of the electrode inserted into the X-ray tube, the length of the electrode inserted into the X-ray tube may also be determined in consideration of the distance between the disc and the target. The electrode may be made of a material different from that of the base, for example, a metallic material such as Kovar may be used.

1.2. Coupling of the Base and the Electrode and Preparation of the Brazing Filler (S120)

The electrodes are inserted into the through-holes of the base to fix the electrodes to the base. Then, a brazing filler (filler metal) is provided at a bonding portion between the base and the electrodes. That is, the brazing filler is formed around the through-holes of the base into which the electrodes are inserted. The brazing filler may be selected from materials having a desired melting point without changing the shapes and properties of the base and the electrodes.

1.3. Bonding of the Base and the Electrode (S130)

Two electrodes passing through the base are bonded to the base by high-temperature brazing. The high-temperature brazing process for bonding the base and the electrodes may be carried out by introducing the base having two electrodes inserted into the through-holes into a desired furnace. As illustrated in FIG. 9, the high-temperature brazing process in the furnace may include the following steps: first heat-up (S131), burn-out (S132), second heat-up (S133), pre-heating (S134), third heat-up (S135), brazing (S136), furnace cooling (S137) and air cooling (S138). That is, the high-temperature brazing process is a process of melting a brazing filler to bond the base and the electrode, where the temperature of the brazing filler is raised to a melting point over a plurality of steps while preventing the deformation or damage of the base and the electrodes and removing organic matters remaining on the base and the electrodes.

Hereinafter, the high-temperature brazing process will be described in more detail for each step with reference to the recipe graph illustrated in FIG. 9.

The first heat-up step (S131) is a process of increasing the temperature of the furnace from room temperature (RT) to a first predetermined temperature at a desired ramp-up rate. For example, the first heat-up step (S131) increases the temperature of the furnace at a ramp-up rate of 10° C./min for 60 minutes to maintain the furnace at a temperature of 600° C. In this case, the ramp-up rate, ramp-up time, and first temperature used for the first heat-up step (S131) may be adjusted, for example within ±10~20% of the exemplified temperature. That is, according to a size and material of the product having two electrodes inserted into the through-holes of the base, and the melting point of the brazing filler, the ramp-up rate, the ramp-up time, and the first temperature may be adjusted to 10±2° C./min, 60±12 mins, and 600±120° C., respectively. The first heat-up step (S131) may be performed to prevent the damage of the product due to rapid temperature increase by gradually increasing the temperature of the furnace. That is, the first heat-up step (S131) allows to prevent the damage of the product due to thermal expansion between a ceramic base and a metal electrode and the brazing filler formed in the bonding portion between the base and the electrodes. Although the ceramic base may undergo a slight dimensional change due to thermal expansion during the first heat-up step (S131), since the coefficient of thermal expansion thereof is smaller than that of other metallic materials, the product is not subjected to a physical impact. However, if the furnace temperature is increased to the brazing temperature with rapid ramp-up rate and time, cracks or damages may occur at the bonding portion between the base and the electrodes. Therefore, it is preferable to perform the first heat-up step (S131) under the foregoing conditions. Also, since there is a problem that the entire process is delayed when the ramp-up rate and time are slower than the foregoing conditions, it is preferable to perform the first heat-up step (S131) while controlling the ramp-up rate and time, and the first temperature depending on the size and material of the base and electrode, and the melting point of the brazing filler.

The burn-out step (S132) is a process of heating the product to the first temperature raised through the first heat-up step (S131) for a desired time to remove residual organic matters. For example, the burn-out step (S132) may be performed at a temperature of 600° C. for 60 minutes. The ceramic base and the metal electrode may be kept in a clean state by chemical pretreatment (i.e., washing), but such chemical pretreatment leaves residual organic matters. Also, cutting oil used in the processing of the ceramic base and the metal electrode may remain in the product. Such residual organic matters may be removed by heat treatment at a desired temperature for a desired time, which may be referred to as a burn-out process. Although the ceramic base may undergo a slight dimensional change due to thermal expansion during the burn-out step at a desired temperature, since the coefficient of thermal expansion thereof is smaller than that of other metallic materials, the product is not subjected to a physical impact.

The second heat-up step (S133) is a process of increasing the temperature of the furnace from the first temperature to a second predetermined temperature at a desired ramp-up rate. For example, the second heat-up step (S133) increases the temperature of the furnace at a ramp-up rate of 10° C./min for 40 minutes to maintain the furnace at a temperature of 1000° C. In this case, the ramp-up rate, ramp-up time, and second temperature used for the second heat-up step (S133) may be adjusted within ±10~20% of the exemplified temperature. That is, according to a size and material of the product having two electrodes inserted into the through-holes of the base, the melting point of the brazing filler, and the first temperature, the ramp-up rate, the ramp-up time, and the second temperature may be adjusted to 10±2° C./min, 40±8 mins, and 1000±200° C., respectively. The second heat-up step (S133) may be performed to increase the temperature of the furnace prior to the pre-heating step (S134).

Next, the pre-heating step (S134) is a process of maintaining the product at the second temperature raised through the second heat-up step (S133) for a desired time. For example, the pre-heating step (S134) may be performed at a temperature of 1000° C. for 30 minutes. Since the brazing filler used in the present inventive concept has a melting point of, for example 1060° C., to reach this temperature, the temperature is uniformly maintained across the product and other elements during the pre-heating.

The third heat-up step (S135) is a process of increasing the temperature of the furnace from the second temperature to a third predetermined temperature at a desired ramp-up rate. For example, the third heat-up step (S135) increases the temperature of the furnace at a ramp-up rate of 12° C./min for 5 minutes to maintain the furnace at a temperature of 1060° C. That is, the temperature is raised to 1060° C. which is the melting point of the brazing filler. The ramp-up rate and the third temperature may be adjusted according to the melting point of the brazing filler.

The brazing step (S136) is a process of performing brazing at the third temperature for a desired time to bond the ceramic base and the metal electrodes. For example, the brazing filler is melted at a temperature of 1060° C., thereby bonding the ceramic base and the metal electrodes and fixing the metal electrodes to the ceramic base. That is, the separate ceramic base and metal electrodes are bonded using the brazing filler. Since the brazing step is performed at a high temperature, the temperature and time may be adjusted in consideration of the respective thermal expansions of the metal and ceramic.

Next, the furnace cooling step (S137) is a process of decreasing the temperature of the furnace used in the brazing step from 1060° C. at a desired rate. For example, the temperature of the furnace may be decreased to 600° C. That is, the temperature of the furnace is lowered from the brazing temperature to a predetermined temperature to remove the brazed product from the furnace.

The air cooling step (S138) is a process of decreasing the temperature of the product removed from the furnace in air.

2. Bonding of the Wire and the Disc (Formation of the Second Part)

The wire and the disc are provided (S210), and the wire is bonded to a lower surface of the disc to form a second part (S220). The bonding of the wire and the disc may be performed using a micro-spot welding process.

2.1. Preparation of the Wire and the Disc (S210)

The wire may be provided to connect the electrodes to the disc. The electrodes may be connected to the disc through the wire in consideration of a distance between the electrodes, a size of the disc, etc. The wire is thinner than the electrode. The wire may be formed of the same or a different material as the electrode. For example, the wire may be formed of tungsten or tungsten alloys. The wire may be made of two separate parts, or as a single elongate part. That is, two wires may be respectively connected to a lower surface of the disc. Alternatively, one wire may be connected to a lower surface of the disc with its central portion bent.

The disc may be provided in the form of a plate having a desired thickness. The disc may be provided in a circular plate shape having a size and a thickness smaller than that of the base. One surface (lower surface) of the disc is bonded to the wire, and the other surface (upper surface) opposite to this surface faces the target. The disc may be made of a metallic material such as Ta. The size of the disc and the length of the wire are major factors that may determine the characteristics (specification) of the product. For example, if an X-ray dose should be 3 mA, the disc may have a diameter of 1.22 mm and a thickness of 0.1 mm, and the wire may have a line width of 0.1 mm and a length of 2.8 mm.

2.2. Bonding of the Wire and the Disc (S220)

The wire may be bonded to the disc to form the second part. The step of bonding the wire and the disc (S220) may be performed by a micro-spot welding process. The wire and the disc may be bonded and secured to each other using a jig. That is, the wire and the disc may be secured to the jig, and then they may be bonded using micro-spot welding. The micro-spot welding process is done within about 0.3 seconds according to the conditions as illustrated in FIG. 10. That is, as illustrated in FIG. 10, the micro-spot welding is performed by applying a current of a few kA for about 0.2 seconds, followed by holding for about 0.1 seconds. At this time, a temperature is increased to about 1000° C. during about 0.2 s when the current is applied, and the temperature is decreased to 600° C. or less during about 0.1 s of holding. The bonding displacement is varied by about 0.1 mm.

3. Bonding of the Wire and the Electrode (S300)

The first part with the base and the electrode bonded and the second part with the wire and the disc bonded are bonded to form the filament (S300). The electrode of the first part is bonded to the wire of the second part wherein an upper end of the electrode may be bonded to a lower end of the wire. A micro-spot welding process may be used as a bonding method to form the filament. The wire and the electrode may be bonded and secured to each other using a jig. That is, the base is secured to the jig to expose a distal end of the electrode and the disc is secured to the jig to expose the wire at a position opposite thereto. Then, the wire may be bonded to the electrode by the micro-spot welding. For example, the micro-spot welding process may be performed in a state in which the first part is secured to a lower side and the second part is secured to an upper side. The micro-spot welding process may be done within about 0.3 seconds as illustrated in FIG. 10. Also, when the first part and the second part are bonded, the center of the disc may be aligned with the center of the base. That is, the center of the disc must be aligned with the center of a target such that an X-ray beam is focused on the target for high-efficiency dose and good resolution in an X-ray technique. According to the present inventive concept, the centers of the base, the disc and the target are aligned to enable the X-ray beam to be concentrated. Also, the characteristics (specification) of the product may be determined by major factors such as the size of the disc and the length of the wire. Here, the length of the wire may be a length between the electrode and the disc. Therefore, it is preferable to perform the micro-spot welding process after determining the length of the wire in consideration of the product characteristics.

V. Embodiments of the Present Inventive Concept

Figure 12:
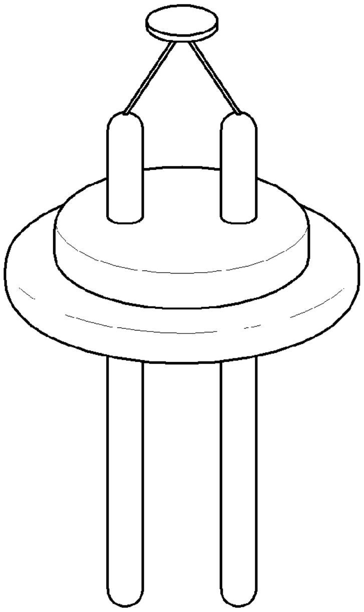
FIG. 12 shows a filament manufactured by a filament manufacturing method according to an embodiment of the present inventive concept.

FIG. 11 is a view showing a product made by micro-spot welding: FIG. 11*a* shows a portion where a disc is bonded to a wire, and FIG. 11*b* shows a portion where an electrode is bonded to a wire. By using the micro-spot welding, the wire is securely bonded to a center of a lower surface of the disc as shown in FIG. 11*a*, and the wire is securely bonded to an upper distal end of the electrode as shown in FIG. 11*b*. FIG. 12 shows a filament manufactured by a manufacturing method according to an embodiment of the present inventive concept. As shown in FIG. 12, a ceramic base and a metallic electrode are bonded by high temperature brazing, a disc and a wire, and the electrode and the wire are respectively bonded by micro-spot welding, thereby forming a robust filament.

VI. Comparison Between the Present Inventive Concept and the Prior Art

Figure 13:
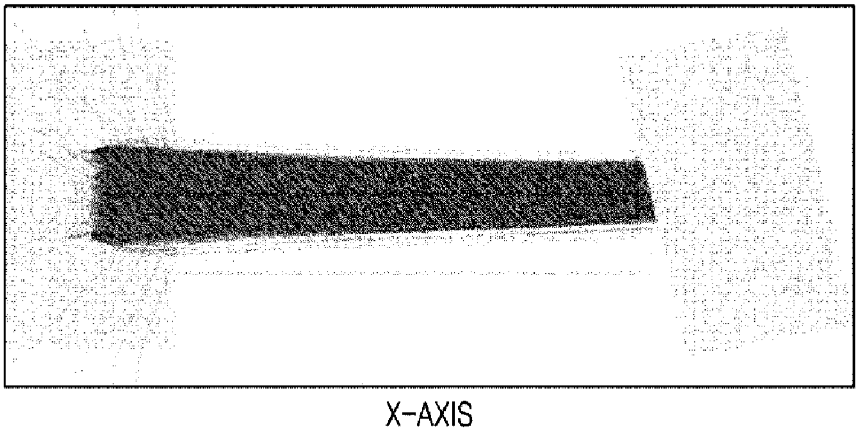
FIG. 13 is a view showing a simulation result of a conventional spring-type filament.
Figure 13:
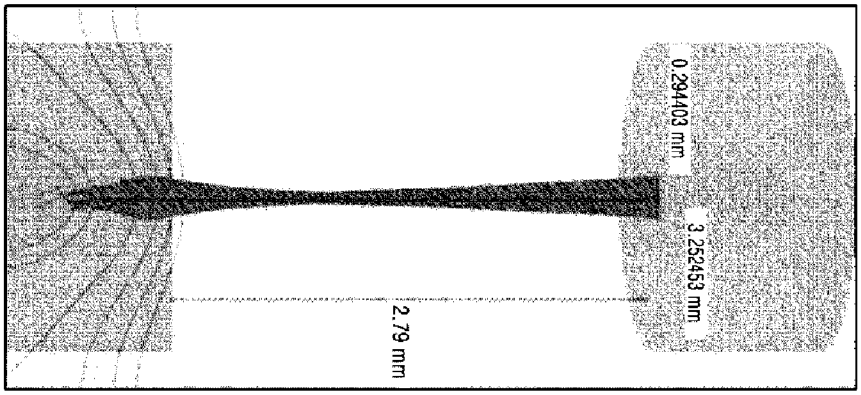
Figure 14:
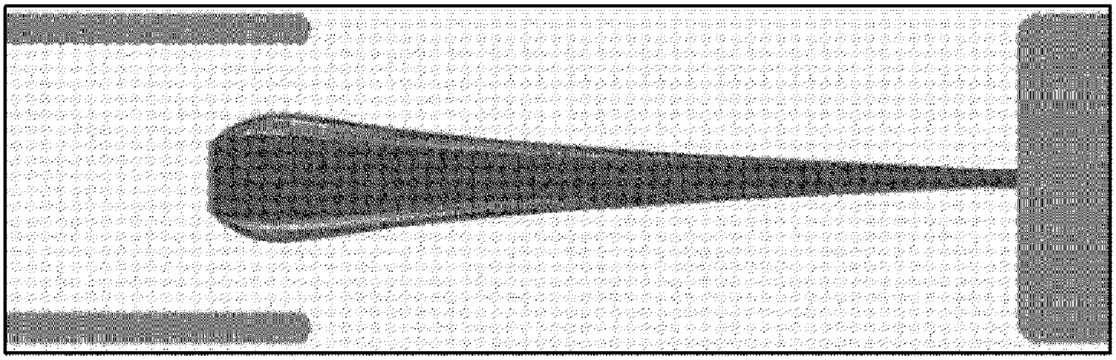
FIG. 14 is a view showing a simulation result of a plate disc-shaped filament according to the present inventive concept.
Figure 14:
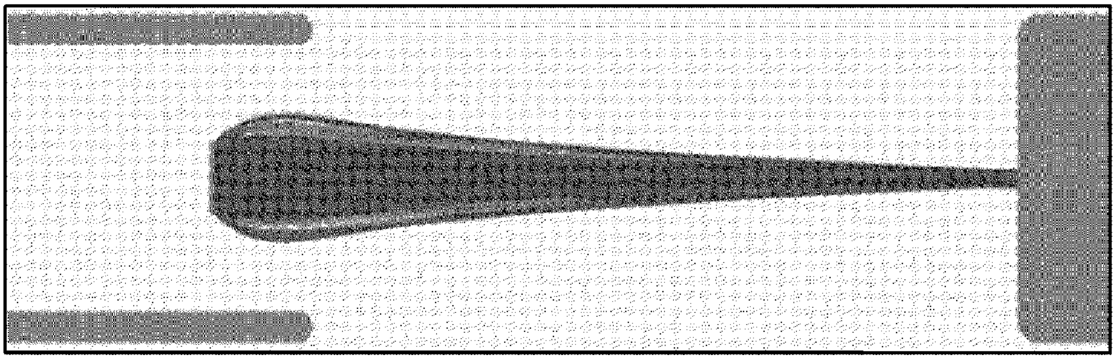

FIG. 13 is a view showing a simulation result of a conventional spring-type filament, and FIG. 14 is a view showing a simulation result of a plate disc-shaped filament according to the present inventive concept. When the spring-shaped filament is used, it can be seen that X-ray beam energy is not concentrated in a narrow area of a target and spreads widely, as shown in FIG. 13. To the contrary, it can be seen that X-ray beam energy is concentrated in a narrow area of a target using the plate disc-shaped filament according to the present inventive concept, as shown in FIG. 14. As such, according to the present inventive concept, X-ray beam energy can be concentrated, thereby obtaining high-efficiency dose and good resolution compared to the prior art.

Although the technical idea of the present inventive concept has been specifically described with reference to the foregoing embodiments, it should be noted that these embodiments are merely illustrative of the present inventive concept and do not serve to limit the present inventive concept. In addition, those skilled in the art will understand that various embodiments may be implemented within the scope of the present inventive concept.

In the drawings of the present inventive concept, the following reference numbers refer to the following elements.

| | |
|---|---|
| 110: base | 120: electrode |
| 130: wire | 140: disc |
| 100: filament | 200: target |
| 300: body | 400: cap |

The invention claimed is:

1. An X-ray tube comprising:

a filament configured to emit electrons by the supply of power;

a target configured to receive the electrons from the filament and emit X-rays;

a body configured to seal the filament and the target while facing each other; and a cap configured to emit heat in close contact with the target, wherein the filament includes:

a plate-shaped base made of a ceramic material;

two electrodes made of a metal material, each passing through and bonded to the base, wherein upper portions of the two electrodes are bent to face each other;

a wire connected to the bent upper portions of the two electrodes; and a plate-shaped disc connected to the wire, wherein the base is larger in size and thicker than the disk, and each of the electrodes has a greater width than the wire.

2. The X-ray tube according to claim 1, wherein the target has a shape inclined in a direction that X-rays are emitted.

3. The X-ray tube according to claim 1, wherein the centers of the base, the electrode and the target are together aligned.

4. The X-ray tube according to claim 1, wherein the base has a double plate shape including a lower first plate and an upper second plate, and wherein the upper second plate has a smaller diameter than the lower first plate.

5. The X-ray tube according to claim 1, wherein the wire is a single continuous wire, wherein its two distal ends are respectively connected to the bent upper portions of the two electrodes, and its central portion is connected to the disk.

* * * * *